Nov. 23, 1965    G. E. SUCHY    3,219,191
DRY CLEANING LIQUID CONDITIONING CARTRIDGE
Filed Dec. 6, 1962    3 Sheets-Sheet 1

INVENTOR.
George E. Suchy
BY Frederick M. Ritchie
His Attorney

Nov. 23, 1965  G. E. SUCHY  3,219,191
DRY CLEANING LIQUID CONDITIONING CARTRIDGE
Filed Dec. 6, 1962  3 Sheets-Sheet 2

INVENTOR.
George E. Suchy
BY Frederick M Ritchie
His Attorney

Nov. 23, 1965         G. E. SUCHY         3,219,191
DRY CLEANING LIQUID CONDITIONING CARTRIDGE
Filed Dec. 6, 1962                         3 Sheets-Sheet 3

INVENTOR.
George E. Suchy
BY
Frederick M. Ritchie
His Attorney

United States Patent Office 3,219,191
Patented Nov. 23, 1965

3,219,191
DRY CLEANING LIQUID CONDITIONING CARTRIDGE
George E. Suchy, Flint, Mich., assignor to General Motors Corporation, Detroit, Mich., a corporation of Delaware
Filed Dec. 6, 1962, Ser. No. 242,704
2 Claims. (Cl. 210—266)

This invention relates to dry cleaning apparatus and more particularly to an improved filter element for filtering and conditioning dry cleaning solvent.

The public acceptance of self-service dry cleaning apparatus has given rise to many different dry cleaning systems. One such system uses a throw-away filter cartridge which is disposed in the path of circulating solvent for removing particulate matter therefrom and for conditioning the solvent by adsorbing dyes or the like. A filter cartridge suitable for use in this growing industry must be efficient, have a long life in cycles of operation and be inexpensive to manufacture.

Accordingly, it is an object of this invention to provide an improved filter cartridge for dry cleaning solvent, such as perchloroethylene.

It is another object of this invention to provide a multicore filter element.

Another object of this invention is the provision of a solvent filter cartridge having a filter paper stage for removing particulate matter, an activated carbon stage for conditioning the solvent by eliminating dissolved contaminants from the solvent and a depth material stage for extending the life of the filter paper.

A further object of this invention is the provision of means for spacing a plurality of adjacent bellows-folded paper filter elements to maintain the surface area of the paper exposed for filtering, thereby to extend the life of the element.

Further objects and advantages of the present invention will be apparent from the following description, reference being had to the accompanying drawings wherein a preferred embodiment of the present invention is clearly shown.

Figure 1:
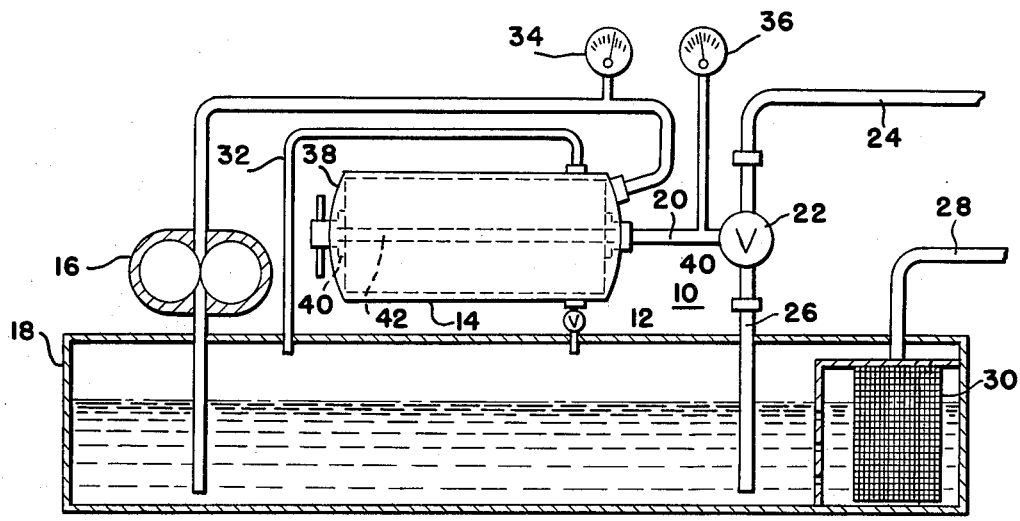
FIGURE 1 is a solvent circulating system for dry cleaning which is suitable for use with the filter cartridge of this invention.
Figure 2:
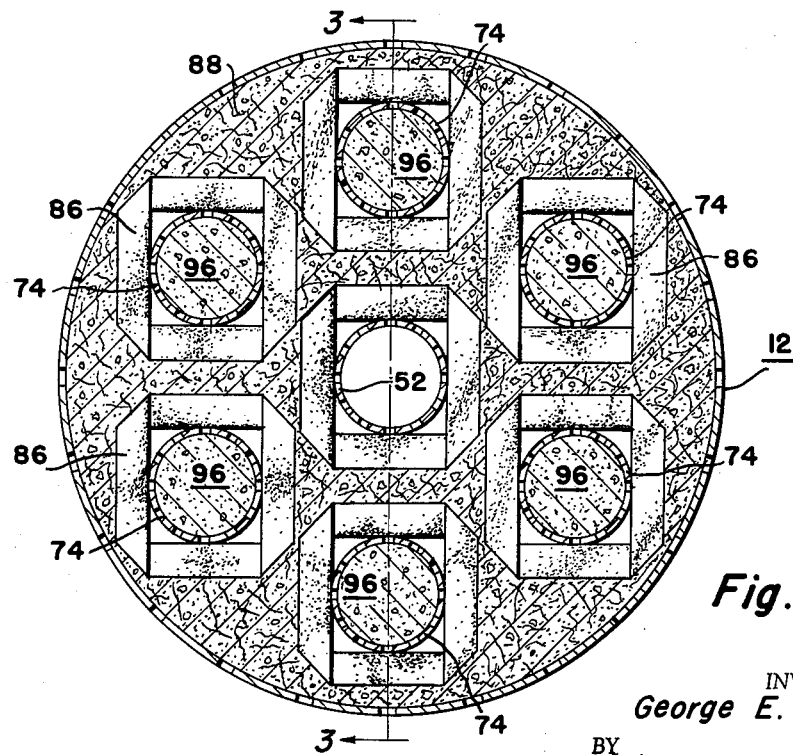
FIGURE 2 is a cross-sectional view of the filter cartridge taken along line 2—2 in FIGURE 3.

In accordance with this invention and with reference to FIGURE 1, a circulating solvent system is shown to include a filter 10 having a filter cartridge 12 and a filter cartridge container 14. The container 14 is adapted to receive solvent from a pump 16 which has its inlet connected to a solvent sump 18. The filter cartridge 12 filters and conditions the solvent flowing from the filter container 14 by way of the outlet conduit 20. This filtered and conditioned solvent may then be directed by a two-way valve 22 either to the fill nozzle of a dry cleaner through a conduit 24 or to the sump by way of the bypass conduit 26. Solvent is returned to the sump from the dry cleaner by way of a drain line 28 and a button trap 30. To prevent air traps in the filter container 14 an air bleeder line 32 may be included. A pressure gage 34 on the inlet side of the filter container 14 and a pressure gage 36 on the outlet side of the filter container indicate pressure differential across the filter container as a measure of the soiled or plugged condition of the filter cartridge 12. The filter container 14 has a removable cover 38 which may be opened for taking out the soiled cartridge 12 and for replacing it with a fresh cartridge. Within the container 14 there are suitable seal means 40 for insuring that the solvent flow will be radially inwardly through the cartridge 12 and dispensed axially from a center passage 42 in the cartridge to the outlet line 20. This invention is directed to an improved filter cartridge 12 for use with this solvent circulating system.

Figure 3:
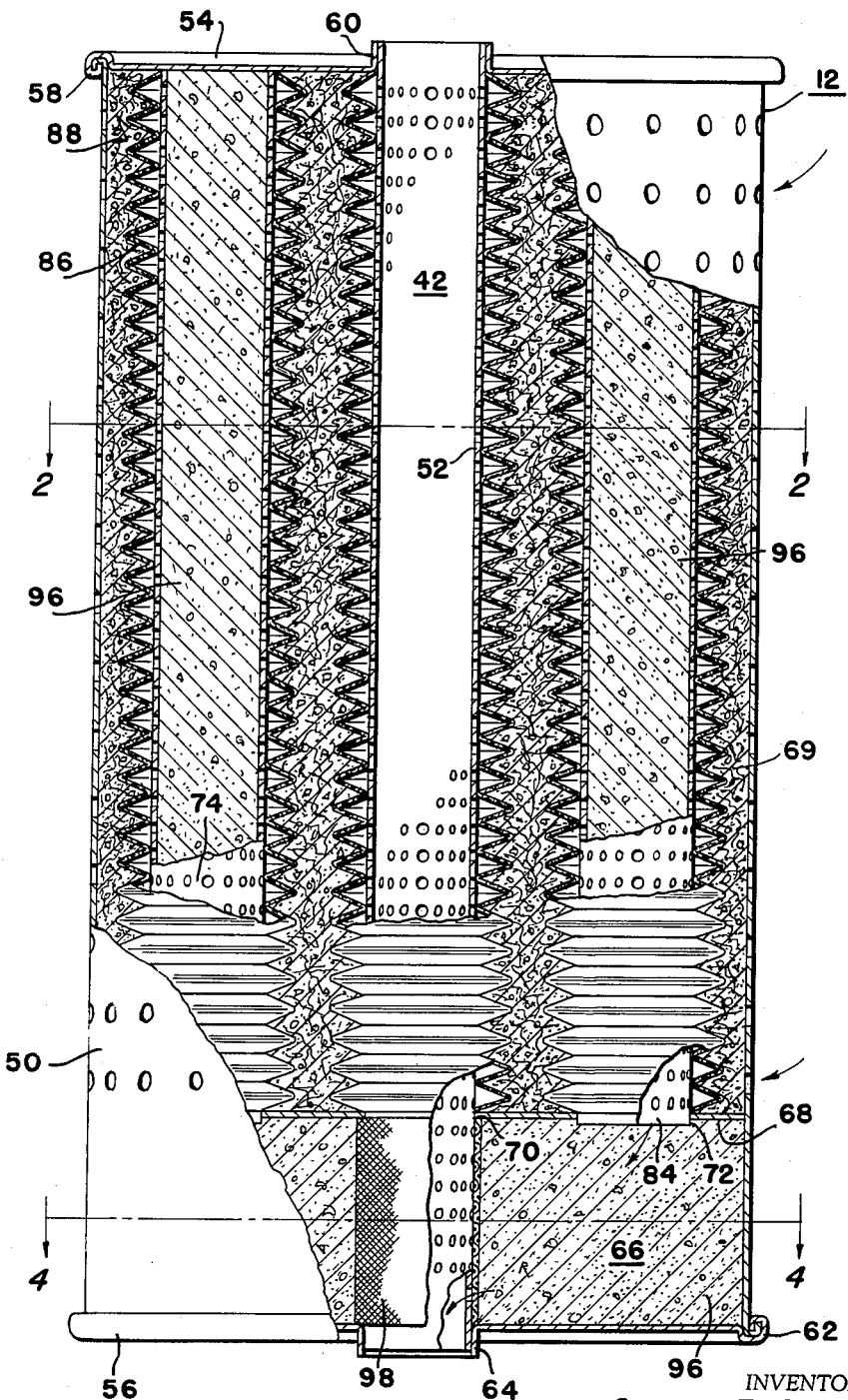
FIGURE 3 is a side sectional view of the filter cartridge taken along line 3—3 in FIGURE 2 including flow arrows to indicate the travel of the solvent through the filter cartridge.
Figure 4:
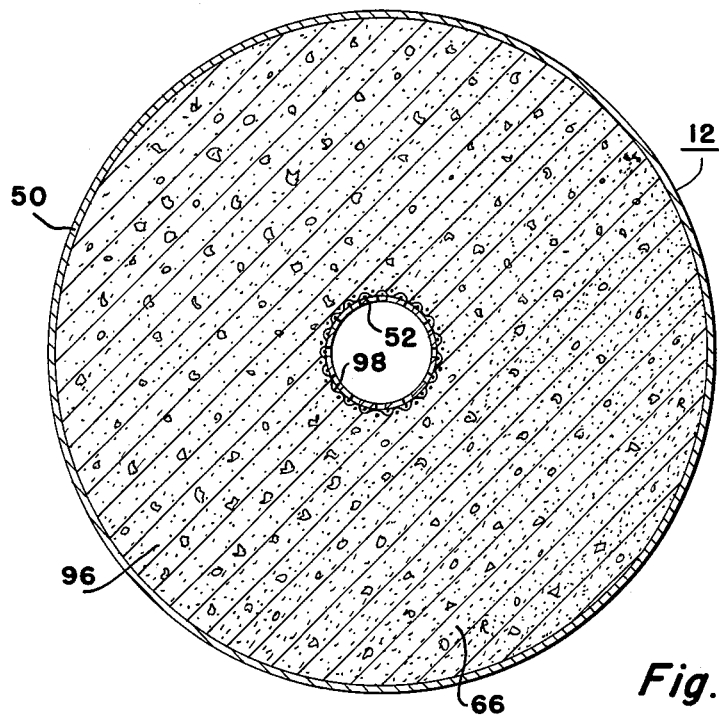
FIGURE 4 is a sectional view taken along line 4—4 in FIGURE 3.

Turning now to FIGURE 3, the filter cartridge 12 is shown comprised of a perforated outer shell 50, a perforated center support tube 52 and a pair of end plates 54, 56 for retaining the outer shell and support tube in spaced relationship. More specifically, the end plate 54 includes an outer peripheral flange 58 and an inner peripheral flange 60, the latter being secured as by welding to the support tube 52. At the other end of the cartridge, the end plate 56, in similar fashion, has an outer peripheral flange 62 connected to the outer shell 50 and an inner peripheral flange 64 supporting the center support tube 52. Thus, an annular filtering and conditioning chamber is formed between the outer shell 50 and the center support tube 52. This chamber is then subdivided by a circular transverse partition 68 into two compartments. The first compartment 69 includes means for both filtering and conditioning the solvent while the second compartment or sump 66 is used primarily for conditioning the solvent. These functions are provided by structure to be described next following.

In general, the multicore characteristics of the filter cartridge 12 is accomplished arranging a plurality of filtering and conditioning tubes on one side of the transverse partition 68. In addition to a central port 70 for receiving and locating the center tube 52, the partition 68 includes a plurality of ports 72 arranged in circumscribing fashion about the center port and adapted to receive one end of a plurality of identical tubes or cores 74 arranged in parallel spaced relationship inside the outer shell. The upper ends of each of these tubes sealingly abut the upper plate 54. Each of the cores 74 supports a bellows-folded paper filter element 86 (FIGURE 5) which may be slipped over each tube in a manner to extend from the partition 68 to the end plate 54. These paper elements 86 may be formed in the manner taught by the patent to McMillan et al., 2,680,998, isssued June 15, 1954. In a cartridge roughly fifteen inches long by seven and one-half inches in diameter, approximately 4200 square inches of bellows-folded paper may be used. Of course, the number of cores and thus the amount of paper could vary depending upon the application for which the filter cartridge is used.

Additional filtering by depth type material is accomplished by stuffing or packing fibrous material 88, such as unlintered cotton seed, Dacron tow, etc., in the voids 69 extending irregularly between the outer periphery of the folded paper elements 86 and the outer shell. Thus, filtering of particulate matter is accomplished in two stages. As solvent moves radially inwardly through the perforations of the outer shell 50, particulate matter is removed by the fibrous material 88 between the outer shell and the paper elements and then, as the solvent passes through the folds of the paper elements 86, additional particulate matter is deposited on the paper folds.

Figures 5, 6:
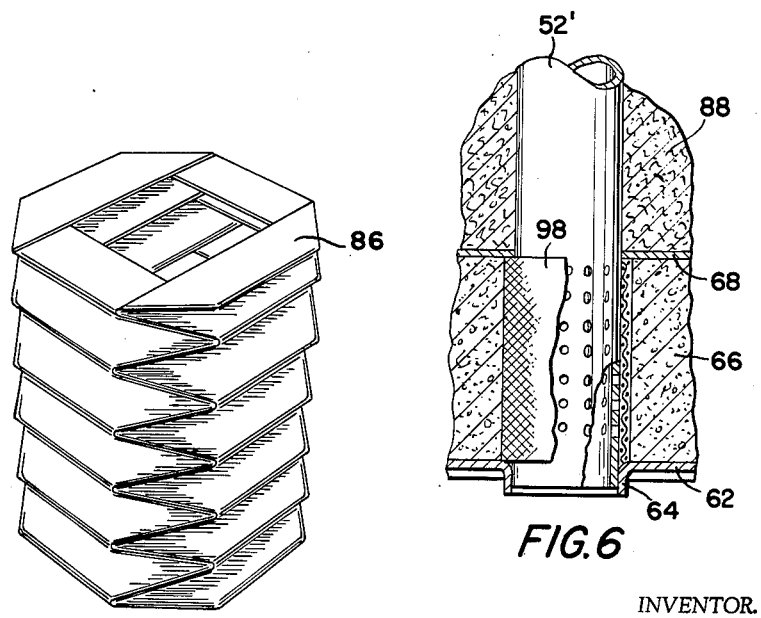
FIGURE 5 is a perspective view of one of the bellows-folded paper filter elements of this invention.
FIGURE 6 is a fragmentary side sectional view of the filter cartridge, similar to FIGURE 3 and showing an alternative arrangement of this invention.

Solvent is further conditioned for the removal of dyes or the like by powdered or granular activated carbon 96. This carbon fills the hollows of the cores 74 as well as the sump 66. Migration of the carbon from the sump 66 is prevented by a screening 98 of Saran wrap or the like which is wrapped around the lower portion of the center support tube 52. It might be noted that with this design a small portion of the solvent by-passes the charcoal by flowing directly to the center tube 52. Although this is not a serious problem in a recirculating dry cleaning application, the problem could easily be overcome by suitably retaining in the center tube a quantity of carbon or by eliminating the perforations in the center support tube 52' above the partition 68 as well as the paper element surrounding the tube (FIGURE 6). Other alternatives will occur to those skilled in the art.

In operation, solvent is pumped to the filter container 38 and moves through the filter cartridge 12 radially inwardly to the center support tube 52 which lines up with the outlet conduit 20 (see flow arrows in FIGURE 3). As the solvent is pumped through the cartridge, it is filtered of particulate matter, first by the fibrous unlintered cotton seed 88 and then by the bellows-folded paper elements 86. Soluble contaminants, such as dyes, are removed or altered into colorless products as the filtered solvent enters the various carbon filled cores 76 and moves axially thereof into the carbon sump 66 where additional activated carbon continues the dye adsorbing process. Completely filtered and conditioned solvent then flows through the perforations in the lower end of the center support tube 52 and axially out of the cartridge by way of the conduit 42 connected in series flow relationship with the filter outlet line 20.

Variations of the filter cartridge 12 to suit a particular application would involve changing the number of cores 74, the paper for the folded elements 86 and the manner in which the paper is folded. The outer ring of cores could also support other types of filter materials. It should be noted also that the design allows for a large increase in the area of exposed filter material.

While the embodiment of the present invention as herein disclosed constitutes a preferred form, it is to be understood that other forms might be adopted.

What is claimed is as follows:

1. A disposable cartridge for filtering dry cleaning solvent comprising an outer shell having inlet perforations in one ortion thereof for receiving said solvent, a support tube inside said outer shell and having outlet perforations in one portion thereof through which filtered and conditioned solvent may be dispensed, a pair of end plate means connecting said outer shell and said support tube in fixed relationship at the ends thereof to define a solvent filtering and conditioning chamber, imperforate partition means extending between said outer shell and said support tube between the ends thereof to divide said filtering and conditioning chamber into first and second compartments, said perforated portion of said support tube being in said second compartment and said perforated portion of said outer shell being in said first compartment, a plurality of perforated, hollow tubular members in said first compartment circumferentially disposed about said support tube and in fixed relationship thereto, each of said tubular members having one end abutting one of said end plate means in substantial sealing relationship thereto and another end extending through said partition means and opening into said second compartment and supporting thereon a bellows-folded paper element coextensive therewith for removing particulate matter from said solvent, means in second compartment and in the hollow of said tubular member for removing nonparticulate matter from said solvent, and depth type filtering material filling the void between said tubular member and said support tube and between said tubular member and said outer shell for removing particulate matter from said solvent and for extending the life of said paper element, whereby said cartridge defines a solvent flow path sequentially through the perforations in said outer shell and said hollow tubular member into said second compartment.

2. A disposable cartridge for filtering dry cleaning solvent comprising an outer shell having inlet perforations in one portion thereof for receiving said solvent, a support tube inside said outer shell and having outlet perforations in one portion thereof through which filtered and conditioned solvent may be dispensed, a pair of end plate means connecting said outer shell and said support tube in fixed relationship at the ends thereof to define a solvent filtering and conditioning chamber, imperforate partition means extending between said outer shell and said support tube between the ends thereof to divide said filtering and conditioning chamber into first and second compartments, said perforated portion of said support tube being in said second compartment and said perforated portion of said outer shell being in said first compartment, a perforated, hollow tubular member in said first compartment in fixed relationship to said support tube, said tubular member having one end abutting one of said end plate means in substantial sealing relationship thereto and another end extending through said partition means and opening into said second compartment and supporting thereon a paper element coextensive therewith for removing particulate matter from said solvent, and means in said second compartment and in the hollow of said tubular member for removing nonparticulate matter from said solvent, whereby said cartridge defines a solvent flow path sequentially through the perforations in said outer shell and said hollow tubular member into said second compartment.

References Cited by the Examiner

UNITED STATES PATENTS

| | | | |
|---|---|---|---|
| 2,595,913 | 5/1952 | Baily | 210—315 X |
| 2,599,734 | 6/1952 | Winslow et al. | 210—438 X |
| 2,732,951 | 1/1956 | DeMagondeau | 210—493 X |
| 2,796,989 | 6/1957 | Kovacs | 210—493 X |
| 2,833,415 | 5/1958 | Wilkinson | 210—315 X |
| 3,132,501 | 5/1964 | Jacobs | 210—439 X |

REUBEN FRIEDMAN, *Primary Examiner.*

HARRY B. THORNTON, *Examiner.*